May 22, 1934.  E. P. DUQUETTE  1,959,948
SIGNALING DEVICE
Filed Dec. 6, 1930
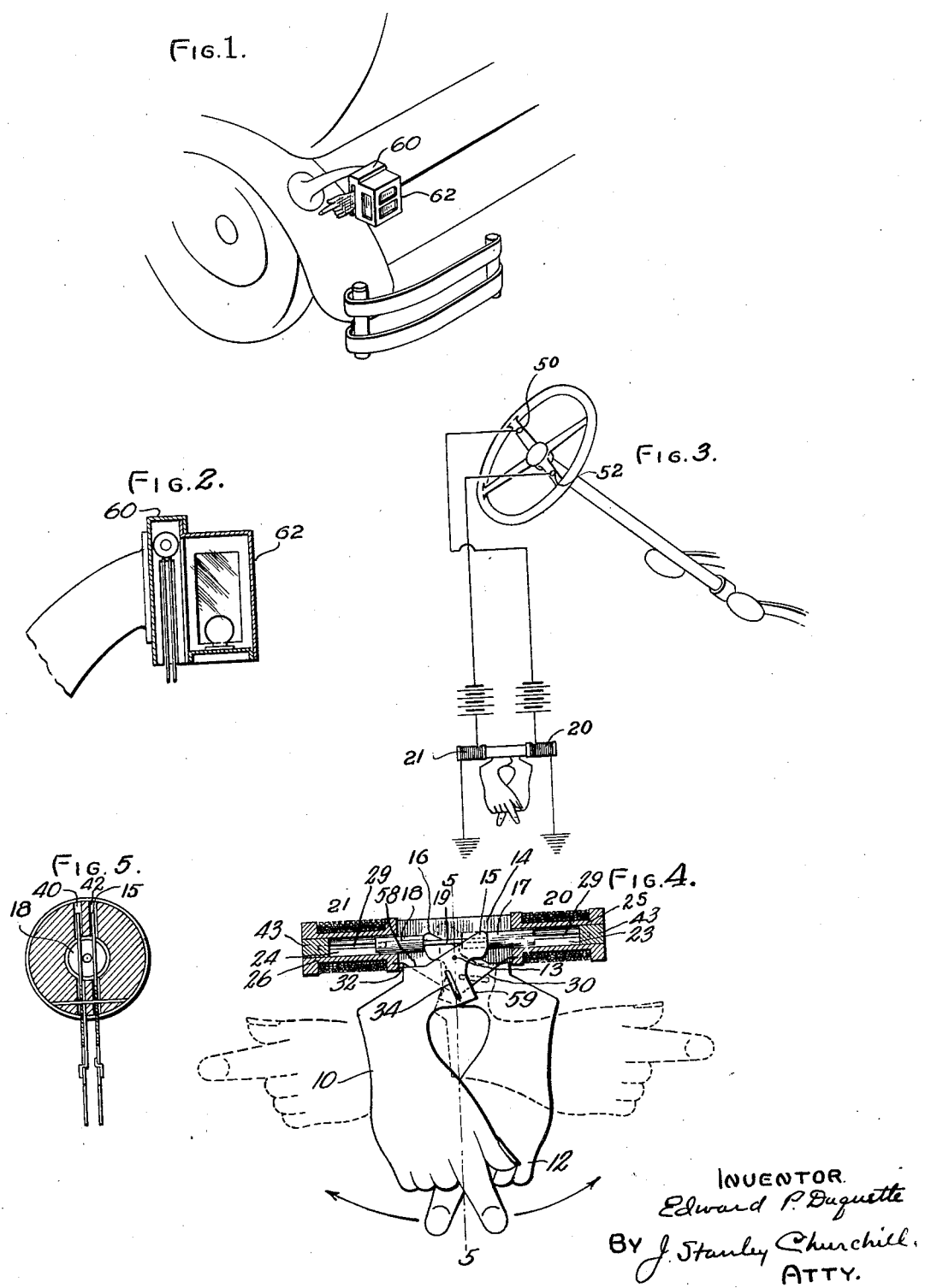
INVENTOR.
Edward P. Duquette
BY J. Stanley Churchill
ATTY.

Patented May 22, 1934

1,959,948

UNITED STATES PATENT OFFICE 1,959,948

SIGNALING DEVICE

Edward P. Duquette, Spencer, Mass.

Application December 6, 1930, Serial No. 500,526

3 Claims. (Cl. 177—327)

This invention relates to a safety signal for motor vehicles.

The object of the invention is to provide a safety signal for motor vehicles of a novel, simple and durable construction, which may be operated for relatively long periods of time without attention, and which is particularly adapted for economical manufacture, requiring a minimum amount of machine work both in the manufacture of its parts and in the assembly thereof, thereby enabling the signal to be marketed at a reasonable price.

With this general object in view, and such others as may hereinafter appear, the invention consists in the safety signal for motor vehicles and in the various structures, arrangements and combinations of parts hereinafter described and particularly defined in the claims at the end of this specification.

In the drawing illustrating the preferred embodiment of the invention, Fig. 1 is a perspective illustrating the present signal embodied in a motor vehicle tail light; Fig. 2 is a vertical sectional view through the combination signal and tail light shown in Fig. 1; Fig. 3 is a diagrammatic view illustrating the control mechanism of the signal; Fig. 4 is a sectional view illustrating the essential part of the signal and the actuating mechanism; and Fig. 5 is a cross-section on the line 5—5 of Fig. 4.

Various safety signals have heretofore been proposed for use upon the rear of motor vehicles to enable the driver of the vehicle to signal to a following driver his intention to alter the course of travel of his motor vehicle, such as his intention to turn to the right or to the left, or to stop. The well-known stop lights now commonly used upon most all motor vehicles serve to efficiently signal the intention of the driver to stop. In general the present invention aims to provide a safety signal which is designed particularly for use in connection with a stop light, to enable the driver to indicate an intention to execute a right or left-hand turn, and the invention further contemplates such a simplified construction of signal as may be manufactured at a relatively small expense, and consequently marketed at a price which will attract motorists to equip their vehicles with the signal.

Referring now to the drawing, which as above stated illustrates the preferred embodiment of the invention, 10, 12 represent signaling members herein shown as comprising hands. The hands 10, 12 may and preferably will be stamped or otherwise formed from sheet metal, preferably aluminum on account of its non-corrodible nature and its lightness. The hands 10, 12 are pivotally mounted at 13 upon a supporting member indicated generally at 14, and which as herein shown comprises a unitary piece of metal, fibre or other rigid material.

Provision is made for oscillating the hands 10, 12 to selectively move either hand from the full to the dotted line position indicated in Fig. 4, thereby indicating the intention of the driver of the vehicle to execute either a right or left-hand turn accordingly as the right or left hand is raised. For this purpose, as herein shown each hand 10, 12 is provided with a portion or extension 15, 16, extended beyond the pivot 13 and which are each engaged by a plunger 17, 18, connected together by a connecting rod 19 to move as one piece. The plungers 17, 18 are respectively slidably received within the core of solenoids 20, 21, and as herein shown the plungers are arranged to slide within the cylinders 23, 24 formed within the ends 25, 26 of the supporting member 14, as shown in Fig. 4. The ends 25, 26 are preferably cut down for the reception of the winding of the solenoid coils 20, 21, and a recess or slot 29 is preferably formed in each of the ends 25, 26 to permit the magnetic fields of the solenoids to exert their influence upon the plungers.

In order to move the hands 10, 12 into their inoperative or non-signaling position or from the dotted to the full line position, as illustrated in Fig. 4, the hands are connected by springs 30, 32 to the supporting piece 14, and as herein shown each spring comprises a flat wire spring, one end of which is set into a slot in the supporting piece, and the other end of which is hooked through an elongated slot 34 in the hand. With this construction, as each hand is moved by its actuating plunger from the full to the dotted line position, or into signaling position, the hooked end of the spring slides upwardly in the slot 34 toward the pivot point 13, thus reducing the effective resistance of the spring against the pull of the solenoid and consequently enabling the hands to be moved with a minimum power. When the particular hand again starts to return to its non-signaling position under the action of the spring, the hooked end of the spring is again returned to the bottom of the slot 34.

In practice I prefer to form the supporting piece 14 of a unitary structure and to provide central vertical slots 40, 42 for the reception of the contact or extended portions 15, 16 of the hands. With this arrangement each slot 40, 42 serves as a guide for its hand and at the same time enables the structure to be compact and to occupy a minimum space.

From the description thus far, it will be observed that in assembling the present signal the plunger unit, including both plungers 17, 18 and the connecting rod 19, may be introduced into the cylinders 23, 24 within the supporting piece 14 through the open end of either cylinder, and thereafter such open end or ends of the cylinder may be closed by a plug 43, driven or otherwise secured therein, so that the plunger unit comprises a floating unit whose movements are controlled by the solenoids 20, 21. Thereafter the ends 15, 16 of the hands 10, 12 may then be inserted up into the slots 40, 42 and the whole secured in operative condition by the introduction of the pivot pin 13 through drilled holes in the hands and through a drilled hole in the supporting piece 14. The plugs 43 are preferably composed of soft iron and are arranged to extend to within the winding of the solenoids, so as to be magnetized and to exert a pull on the end of the plungers 17, 18.

The solenoids 20, 21 are each preferably included in separate circuits and are adapted to be controlled by control buttons 50, 52 located within convenient reach of the operator of the motor vehicle, and as illustrated in Fig. 3 the control buttons may be located upon the steering wheel of the motor vehicle. Each circuit includes the battery of the motor vehicle and is grounded at the push button and at one end of each solenoid. With this arrangement, when the operator desires to signal that he is about to make a right-hand turn, he pushes the right-hand button 52, thus energizing the solenoid 21 and drawing the plunger 18 into the solenoid 21 and operating through contact of the second plunger 17 with the extended portion 15 of the right hand, to swing the right hand up into the dotted line or signaling position illustrated in Fig. 4. Similarly when it is desired to signal for a left turn, the operator pushes the push button 50, energizing the solenoid 20, drawing in the plunger 17 to within the solenoid 20 and operating through the contact of the plunger 18 with the extended end 16 of the left hand to swing the left hand up into its dotted line or signaling position, as illustrated in Fig. 4. When the push buttons are released, the solenoids are immediately deenergized and the springs 30, 32 immediately return the hands to non-signaling position. Each hand is provided with two stops 58, 59, which engage the under surface of the supporting piece 14, when the hands are in either their signaling or non-signaling position, thus permitting the solenoids 20, 21 and springs 30, 32 to hold the hands firmly in such position.

In view of the simplicity of the present construction of signaling device, together with the fact that a minimum amount of machine work is required in both its construction and assembly, the present signal may be manufactured at a minimum expense and marketed at a price comparable to the price at which the universally used stop lights are sold. In practice the signal unit illustrated in Fig. 2 may and preferably will be mounted within an auxiliary compartment 60 as part of the ordinary stop light indicated at 62. Provision is preferably made for permitting lateral illumination from the stop light to illuminate the hands when the latter are extended through lateral slots in the compartment 60 in signaling position.

While the preferred embodiment of the invention has been herein illustrated and described, it will be understood that the invention may be embodied in other forms within the scope of the following claims.

Having thus described the invention what is claimed is:—

1. In a signaling device of the character described, in combination, a supporting member provided with two solenoids spaced apart and in axial alignment, a plunger for each solenoid, means for connecting the plungers together to move as a unit when either solenoid is energized, a pair of signaling members pivoted to the supporting member and capable of independent movement, said members being normally in non-signaling position, each member having a portion projecting between said solenoids and into the path of movement of one of said plungers, to be contacted and moved by the plunger to pivotally move the signaling members selectively into signaling position according to which solenoid is energized.

2. In a signaling device of the character described, in combination, a supporting member provided with two solenoids spaced apart and in axial alignment, a plunger for each solenoid, means for connecting the plungers together to move as a unit when either solenoid is energized, a pair of signaling members pivoted to the supporting member and capable of independent movement, said members being normally in non-signaling position, each member having a portion projecting between said solenoids and into the path of movement of one of said plungers, to be contacted and moved by the plunger to pivotally move the signaling members selectively into signaling position according to which solenoid is energized, and springs cooperating with said signaling members for assisting in returning them to non-signaling position.

3. In a signaling device of the character described, in combination, an elongated supporting member provided with a solenoid at each end thereof, said solenoids being in axial alignment, a plunger within each solenoid, means for connecting the plungers together to form a floating unit said unit being moved when either solenoid is energized, a pair of signaling members pivoted to the supporting member and capable of independent movement, each of said signaling members being provided with a portion extending between the solenoids and into the path of one of the plungers, and spring means secured to the supporting member and cooperating with the signaling members for moving the members into signaling position, said plungers operating to selectively move the members into another position according to which solenoid is energized, said members being provided with stops for engaging the supporting member to limit the movement of the members in either direction.

EDWARD P. DUQUETTE.